J. A. SEEDE.
ARC WELDING.
APPLICATION FILED JAN. 9, 1914.
1,262,396.
Patented Apr. 9, 1918.
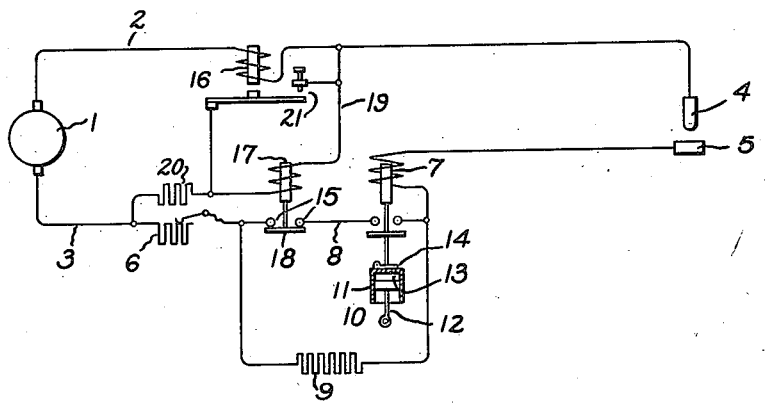
WITNESSES:
INVENTOR:
JOHN A. SEEDE,
BY
HIS ATTORNEY.

UNITED STATES PATENT OFFICE.

JOHN A. SEEDE, OF NISKAYUNA, NEW YORK, ASSIGNOR TO GENERAL ELECTRIC COMPANY, A CORPORATION OF NEW YORK.

ARC-WELDING.

1,262,396.  Specification of Letters Patent.  Patented Apr. 9, 1918.

Application filed January 9, 1914. Serial No. 811,267.

*To all whom it may concern:*

Be it known that I, JOHN A. SEEDE, a citizen of the United States, residing at Niskayuna, county of Schenectady, State of New York, have invented new and useful Improvements in Arc-Welding, of which the following is a specification.

My invention relates to electric arc welding and the object of my invention is to provide arc welding systems with means for preventing the supply of undesirably high values of current to the work.

The greatest danger of an unduly high current exists at the striking of the arc when the electrode is in contact with the work. To minimize the chance of injury at this stage of the operation I propose to then limit the current supplied to the work to a low value, preferably for an appreciable interval of time after the electrode is first brought into engagement with it, a sufficiently long period of time to allow the operator to establish the arc. After the arc is established the danger is to a considerable measure passed and the current limiting means may be removed from the circuit, for if the arc is properly manipulated the resistance of the arc itself and the regulating resistance sufficiently limit the current. All chance of undue currents is not however, passed; due to inexperience or accident, the operator may leave the electrode too long in contact with the work, or maintain too short an arc, or in some other way apply too much current after the period of time given him to strike the arc. To complete the protection therefore, I prefer also to limit the current during the continuance of the welding operation, or rather after the time given the operator to establish the arc. Preferably also for the sake of economy I employ substantially the same resistance member to limit the current both at the beginning of the operation and during its continuance.

In a single figure of the drawing I have illustrated diagrammatically an arc welding system involving my invention in its complete and preferred form.

The generator 1 is the source supplying energy through the connections 2 and 3 and the electrode 4 to the work 5. The connections include the usual regulating resistance 6 for steadying the arc and determining the operating current. In series with the connection 3 is a series relay 7, the contacts of which are adapted to close a shunt 8 about a resistance member 9. The series relay 7 is preferably designed to close its contacts an appreciable interval of time after it receives sufficient energy to cause its actuation; this characteristic may be obtained in any of the well known ways and may be aided or wholly secured as illustrated by a dash pot 10. The cylinder 11 of the dash pot 10 is attached to the core of the relay and the piston 12 is attached to any suitable stationary member; the cylinder 11 is provided with a port 13 and a valve 14 therefor. As will be seen from the drawing, the valve is so arranged that the relay 7 is allowed to operate to close its contacts but slowly while it may operate in the opposite direction to open the contacts unresisted by the dash pot, the valve 14 turning about its pivot and allowing the air within the cylinder to escape through the port 13 as the cylinder descends. The relay 7 and the resistance 9 will limit the current supplied to the electrode 4 and the work 5 for a period of time after the current is first established between the electrode and the work; during this period the operator may withdraw the electrode from the work and establish the arc. The resistance 9 preferably limits the current to such a value that no injury to the work can take place even when the electrode actually engages the work. After the given interval of time during which the operator is supposed to establish the arc, the shunt 8 about the resistance 9 is closed and the full operating voltage applied between the electrode 4 and the work 5.

If the workman is careful, only so much protection as has been described may be required, but due to inexperience or accident, the operator may leave the electrode 4 in contact with the work 5 instead of separating them and properly drawing the arc; the operator may indeed, after properly drawing the arc and after the closing of the shunt 8, again bring the electrode so close to the work as to reduce the resistance of the arc to such a low value as to injure the work. To prevent any undue current, and thus to complete the protection of the work, I have provided the contacts 15 in the shunt 8 controlled by the series relay 16. A relay 17 carries the bridging contact 18 for the contacts 15 and is supplied with energy through the connections 19 in which is placed a resistance 20 to limit the current to any proper value. In a circuit in shunt to the relay 17 are the contacts 21 of the relay 16; normally these contacts are open, but they are designed to be closed when the current through the relay 16 reaches a value approaching that dangerous to the work, or any other undesired value of current. It will be apparent that when the contacts 21 are closed, the relay 17 is deprived of current and that the bridging contact 18 must leave the contacts 15, opening the shunt 8. The resistance 9 then again limits the current supplied to the work. It is immaterial to my invention in a broad sense whether this relay 16 is instantaneous acting or not, but preferably it is given a sluggish characteristic in order to allow for certain variations for short periods of time, or for any other purpose.

It will be understood from the above that my invention provides, first, for preventing an undue current at the beginning of the welding operation, and, second, for a more complete protection by providing against such a current not only at the beginning of the operation, but also during the whole period of the operation. My invention is not, obviously, limited to the specific arrangement I have disclosed above, but there are various other specific arrangements by which it may be carried out and which I intend to include within the terms of the appended claims.

What I claim as new and desire to secure by Letters Patent of the United States, is:—

1. In an electric arc welding system, a source of energy, connections to said source adapted to supply energy to the work, a resistance completing the circuit through said connections and work, and means timed to operate after an appreciable interval of time from the application of energy to the work for removing said resistance from the circuit.

2. In an electric arc welding system, a source of energy, connections to said source adapted to supply energy to the work, a resistance completing the circuit through said connections and work, means timed to operate after an appreciable interval of time from the application of energy to the work for removing said resistance from the circuit, and other means for reinserting said resistance into the circuit.

3. In an electric arc welding system, a source of energy, connections to said source adapted to supply energy to the work, a resistance completing the circuit through said connections and work, means timed to operate after an appreciable interval of time from the application of energy to the work for removing said resistance from the circuit, and means operable on an undesirably great supply of energy for reinserting said resistance into the circuit.

4. In an electric arc welding system, a source of energy, connections to said source adapted to supply energy to the work, and means timed to limit the supply of energy to the work for an appreciable period of time after the application of energy thereto.

5. In an electric arc welding system, a source of energy, connections to said source adapted to supply energy to the work, and means timed to limit the supply of energy to the work for an appreciable period of time after the application of energy thereto and also upon the tendency to supply an undesirably high value of current thereto.

6. In an electric arc welding system, a source of energy, two terminals between which the arc is adapted to be drawn, a resistance included in the circuit between said source and terminals, a series relay in the circuit between said source and terminals operable by the energy supplied to the terminals for removing said resistance from the circuit and a second similarly located series relay operable by an undesirably great supply of energy for reinserting said resistance into the circuit.

In witness whereof, I have hereunto set my hand this 7th day of January, 1914.

JOHN A. SEEDE.

Witnesses:
  BENJAMIN B. HULL,
  MARGARET E. WOOLLEY.